United States Patent [19]

Philippi et al.

[11] 4,008,315

[45] Feb. 15, 1977

[54] PROCESS FOR REDUCING NITROGEN OXIDE LOSSES FROM CERTAIN SLURRIES AND SOLUTIONS BY THE ADDITION OF PHOSPHATE SALTS

[75] Inventors: Ernst-Helmut Philippi, Polsum; Helmut Pokorny, Gelsenkirchen; Wolfgang Mumme, Oer-Erkenschwick, all of Germany

[73] Assignee: Veba-Chemie AG, Gelsenkirchen-Buer, Germany

[22] Filed: Jan. 2, 1973

[21] Appl. No.: 320,389

[30] Foreign Application Priority Data

Dec. 31, 1971 Germany .................. 2165807

[52] U.S. Cl. .................. 423/319; 71/39; 423/167; 423/235; 423/239
[51] Int. Cl.² .......................... C01B 25/16
[58] Field of Search .......... 423/385, 395, 319, 235, 423/317, 312, 313, 400; 71/39

[56] References Cited

UNITED STATES PATENTS

| 1,604,660 | 10/1926 | Ross et al. | 423/395 |
|---|---|---|---|
| 1,936,316 | 11/1933 | Wadsted | 423/319 |
| 2,036,244 | 4/1936 | Wadsted et al. | 71/39 |
| 2,041,504 | 5/1936 | Weston | 423/395 |
| 2,114,600 | 4/1938 | Larsson | 423/319 |
| 3,049,418 | 8/1962 | Brown et al. | 71/39 |
| 3,431,098 | 3/1969 | Trimbach et al. | 71/39 |
| 3,528,797 | 9/1970 | Funk et al. | 71/39 |
| 3,594,150 | 7/1971 | Cannon | 71/39 |

FOREIGN PATENTS OR APPLICATIONS

| 1,487,428 | 1967 | France | 423/319 |
|---|---|---|---|
| 248,807 | 1943 | Switzerland | 423/319 |
| 648,330 | 1947 | United Kingdom | 71/39 |
| 186,985 | 1966 | U.S.S.R. | 423/235 |

OTHER PUBLICATIONS

Chemical Abstracts, vol. 52, p. 13204 (1958).

*Primary Examiner*—Oscar R. Vertiz
*Assistant Examiner*—Eugene T. Wheelock
*Attorney, Agent, or Firm*—Burgess, Dinklage & Sprung

[57] ABSTRACT

Nitrous oxide losses are reduced by bringing acid to weakly alkaline salt solutions or suspensions into media containing nitrous oxide or media which develop nitrous oxide.

5 Claims, No Drawings

PROCESS FOR REDUCING NITROGEN OXIDE LOSSES FROM CERTAIN SLURRIES AND SOLUTIONS BY THE ADDITION OF PHOSPHATE SALTS

The invention relates to methods for reducing nitrous oxide losses through the use of salt solutions and suspensions. Nitrous oxide losses may occur in reactors and in gas volumes in which the nitrogen oxides that have formed or are present fail to be transformed to nitrite or nitrate and thus to become fixed as salts in solutions or in solid form. The said salt solutions and suspensions are capable of washing nitrogen oxides out of gases containing nitrous oxides. If these agents are sprayed onto the surface of rock phosphate being reacted with nitric acid, then not only is a reduction of the nitrogen oxide losses brought about, but also the formation of foam is greatly suppressed.

In the decomposition of phosphate rock with nitric acid a relatively severe foaming is generally observed. This is to be attributed to the fact that components of the phosphate rock which have a reducing action partially reduce the nitric acid, so that nitrogen oxides are formed.

Through the addition of antifoaming agents, especially those on a silicone basis, it is possible to keep the surface of the decomposition suspension largely free of foam. It is also possible to keep the foaming down by very intense stirring. The nitrous gas formation itself is effected but slightly by such procedures. It is nevertheless necessary in these two rather expensive methods to wash the nitrous gases out of the exhaust from the phosphate rock decomposition processes (cf. for example Patent application P 21 el 944.3 of Aug. 21, 1971) or to destroy them by suitable methods, e.g., with aminosulfonic acid or by catalytic afterburning.

Now, it has been found that the nitrous gas losses can be substantially diminished by bringing acid to weakly alkaline salt solutions into contact with agents containing nitrous oxide or which develop nitrous oxide.

The solutions or suspensions of salts are especially solutions or suspensions of the nitrates, chlorides, sulfates or phosphates of ammonium, of the alkali metals or of magnesium, or solutions or suspensions of the chlorides and nitrates of the alkaline earth metals. Preferably those salts are used which can be the components of fertilizers.

It is, of course, also possible to use mixtures of such salts. Particularly involved are intermediates from the fertilizer industry or dissolved or suspended fertilizers themselves. A so-called "slurry solution" which is produced in the washing of vapors from the evaporation of fertilizers and of the dusts from the dryers in a corresponding washer. The composition of a slurry solution of this kind is shown in Table 1.

Table 1

| Composition of the so-called "slurry solution" | |
|---|---|
| CaO | 0.01% |
| $K_2O$ | 1.5% |
| $Na_2O$ | 1.5% |
| $NH_4$—N | 2.9% |
| $NO_3$—N | 0.3% |
| $SO_3$ | 1.19% |
| $P_2O_5$ (total) | 10.94% |
| Cl | 1.24% |

The above-named salts are to be used in solutions of at least 3%. Undissolved salts have virtually no effect on the nitrogen oxides, yet solutions only should be used if these media have to be aspirated during the process through narrow pipes, so that the danger exists that solids might settle in constrictions and in the bends in pipes. The optimum content differs according to the salts being used. In some cases it should be determined by experiment.

The pH of the salt solutions or suspensions should generally be under 7, although under certain circumstances a pH of 8 appears allowable. On account of the heat of neutralization that is released in the case of weakly alkaline solutions upon the access of the (acid) nitrogen oxides, however, it is best to use acid solutions or suspensions from the outset. In some cases the solution can be acidified by the addition of mineral acid, especially, of course, those acids which correspond to the anion that is present. After acidification it is desirable to cool the solutions or suspensions, not using them until they have been cooled.

The characteristics of the solutions used in the experiments are listed in Table 2.

Table 2

| Characteristics of the solutions used in the experiments | | | | |
|---|---|---|---|---|
| No. | Substance | Concentration Weight-Percent | pH | Density g/ml |
| 1 | "Slurry Solution" | see Table 1 | 4,6 | $1,12_2$ |
| 2a | $(NH_4)_2 HPO_4$ | 20 | 5,9 | $1,11_2$ |
| 2b | | 5 | 5,5 | $1,02_4$ |
| 3a | $NH_4NO_3$ | 20 | 5,8 | $1,06_8$ |
| 3b | | 5 | 6,3 | $1,01_0$ |
| 4a | $(NH_4)_2SO_4$ | 20 | 5,5 | $1,10_6$ |
| 4b | | 5 | 5,6 | $1,02_0$ |
| 5a | KCl | 20 | 6,6 | $1,12_8$ |
| 5b | | 5 | 7,5 | $1,02_4$ |
| 6a | NaCl | 20 | 6,5 | $1,14_4$ |
| 6b | | 5 | 6,4 | $1,02_6$ |
| 7a | $Mg SO_4 \cdot 7H_2O$ | 20 | 5,3 | 1,125 |
| 7b | | 5 | 5,6 | 1,021 |
| 8a | $Ca(NO_3)_2$ | 20 | 6,3 | $1,12_4$ |
| 8b | | 5 | 7,0 | $1,02_4$ |
| 9a | $H_2NCONH_2$ | 20 | 7,2 | $1,04_6$ |
| 9b | | 5 | 7,0 | $1,00_4$ |
| 10 | $H_2SO_4$ | 96 | — | 1,84 |
| 11 | $H_3PO_4$ | 71 | — | 1,62 |

Other salts not listed in the table may, of course, be used in solution or suspension in accordance with the invention for reducing the nitrous oxide content of nitrous media, providing they are used at an appropriately high concentration and viscosity and at pH values between 0.5 and 8, preferably between 1 and 7.

The nitrous media with which the salt solutions or suspensions are to be brought into contact include all nitrous gases. In other words, they include both the nitrous gases in the form in which they are produced in absorption installations for the manufacture of nitric acid and the nitrous exhaust gases which are liberated in nitration reactions in organic chemistry or in caustic processes by means of solutions containing nitric acid, or in other reactions. A special embodiment of the method of the invention is the direct use of the described salt solutions in reactions in which nitrogen oxides form. Therefore, a reaction chamber in which nitrogen oxides are formed by the chemical reaction of suitable reagents is also to be considered as a nitrous medium. The method of the invention can consequently be applied with special advantage to the decomposition of phosphate rock with nitric acid which was mentioned on page 1. A desirable secondary effect of this application is that, when these salt solutions or suspensions are used, foaming in partially or entirely suppressed depending on the specific effect of the solution used. This is shown by the experimental results listed in Table 3b which were obtained by the use of the salt solutions listed in Table 2 under the experimental conditions described in Table 3a.

form of concentrated solutions or suspensions are formed right in the reaction vessel, for example by the introduction of ammonia and/or the addition of soda or potash lye, success has not been observed. Probably the heat of neutralization that was released by the addition of these basic substances obstructed the absorption of the nitrogen oxides. When ammonia was used, the Table 3

Method A
Reduction of foaming in phosphoric acid production with nitric acid.
a) Experimental conditions:

| Throughput: | 10,0 m³ | $HNO_3$ (56% sol.)/h |
| --- | --- | --- |
| | 5,2 t | Phosphate rock per hour |
| | 1,5 m³ | Salt solution per hour |
| | 4000 m³/h | Vented nitrous gas |

Decomposition vessel:
| Capacity | 20 m³ |
| --- | --- |
| Surface area | 7 m² | b) Experimental results:

| No. | Substance | Concentration in wt-% | Nitrous content with / without salt solution g NO/m³ | | Effectiveness in % | Absorbed nitrous oxide kgNO/h | Foaming |
| --- | --- | --- | --- | --- | --- | --- | --- |
| 1 | Slurry solution | see Table 1 | 8,2 | 0,9 | 89 | 29,2 | slight |
| 2a | $(NH_4)_2HPO_4$ | 20 | 7,9 | 1,1 | 86 | 27,2 | slight |
| 2b | | 5 | 7,9 | 1,9 | 76 | 24,0 | moderate |
| 3a | $NH_3NO_3$ | 20 | 7,7 | 5,0 | 35 | 10,8 | moderate |
| 3b | | 5 | 8,3 | 5,8 | 30 | 10,0 | moderate |
| 4a | $(NH_4)_2SO_4$ | 20 | 8,2 | 6,0 | 27 | 8,8 | moderate |
| 4b | | 5 | 8,0 | 6,3 | 21 | 6,8 | heavy |
| 5a | KCl | 20 | 8,5 | 6,2 | 27 | 9,2 | heavy |
| 5b | | 5 | 7,6 | 5,9 | 22 | 6,8 | heavy |
| 6a | NaCl | 20 | 8,1 | 5,9 | 27 | 8,6 | heavy |
| 6b | | 5 | 7,5 | 5,7 | 24 | 7,2 | heavy |
| 7a | $MgSO_4 \cdot 7H_2O$ | 20 | 11,1 | 7,1 | 36 | 17,0 | heavy |
| 7b | | 5 | 10,9 | 7,5 | 34 | 13,6 | heavy |
| 8a | $Ca(NO_3)_2$ | 20 | 7,2 | 5,7 | 21 | 6,0 | heavy |
| 8b | | 5 | 6,9 | 5,7 | 18 | 4,8 | heavy |
| 9a | $H_2NCONH_2$ | 20 | 7,7 | 0,1 | 99 | 30,4 | slight |
| 9b | | 5 | 8,1 | 0,3 | 96 | 31,2 | slight |

In this special embodiment of the method of the invention it is not necessary to reduce the pH of the salt solution or suspension very far below 7, because the nitric acid used for the decomposition of the phosphate rock is generally not weaker than a 45% solution. The reaction solution, therefore, sometimes becomes rather strongly acid. But the salt solution used should be at least so acid that, when it is mixed with the mass that is to be decomposed no additional neutralization heat will be yielded. Precooling the salt solution and/or the decomposition solution diminishes foaming, but under certain circumstances it delays the progress of the decomposition reaction. Further reduction of foaming is to be expected when the decomposition is performed in pressure reactors at elevated pressure.

The decomposition of phosphate rock with mixed acids, such as a mixture of sulfuric and nitric acid or of phosphoric acid and nitric acid, is generally known from the literature. That nitrogen oxides dissolve easily into concentrated sulfuric acid has pertained to the state of the art since the performance of the lead chamber process.

A substantial suppression of foaming, however, has not been observed when phosphoric acid or sulfuric acid or water were used as additives in the decomposition of phosphate rock with nitric acid. Even when the salts which have a favorable action when added in the form of ammonium silicofluorides also took place, which then sublimated and deposited themselves at constrictions in the pipe system, thus leading gradually to the clogging of the apparatus.

Another embodiment of the method of the invention is the use of salt solutions or suspensions in nitrogen oxide absorption apparatus for the production of nitric acid. If it is desired to obtain nitric acid as the principal product in these apparatus, the method of the invention will be applied only to the nitrous residual gases in which the NO concentration has diminished below certain levels. Such methods are especially suitable for combined operations in which the withdrawn salt solutions can be profitably used in NPK [nitrate-phosphate-potash] plants. In this case the additional advantage is obtained of being able to produce a nitric acid of especially high concentration.

A further embodiment of the method of the invention is its use in those cases in which the nitrogen oxide content of nitrous gas emissions is to be reduced so as to eliminate pollution of the environment. Examples of the application of the method to nitrous residual gases having low NO contents are shown in Table 4.

In this embodiment of the method, the nitrogen oxide-containing gases are passed preferably in a counterflow through intensively acting absorption systems, such as columns or cascades to which the above-named salt solutions or suspensions are fed.

Table 4

Method B

Table 4-continued

Absorption of nitrous gases by solutions a) Experimental conditions:

| | |
|---|---|
| Throughput | 4000 m³ of nitrous gases per hour |
| Useful volume of the absorption tower | 3.16 m³ |
| Gas velocity in tower | 1.4 m/sec |
| Gas detention time in tower | 3.5 sec |
| Solution circulation rate | 10 m³/h | b) Results of Experiments:

| No. | Substance | Concentration in wt.% | Nitrous in inert gas gNO/Nm³ | content in residual gas gNO/Nm³ | Efficiency % | Absorbed nitrous oxide kgNO/h | Amount solution withdrawn or replaced m³/n |
|---|---|---|---|---|---|---|---|
| 1 | Slurry Solution | See Table 1 | 7,6 | 0,9 | 88 | 26,8 | 0,5 |
| 2a | $(NH_4)_2HPO_4$ | 20 | 6,9 | 1,2 | 83 | 22,8 | 0,5 |
| 2b | | 5 | 8,3 | 1,8 | 78 | 26,0 | 1,0 |
| 3a | $NH_4NO_3$ | 20 | 8,1 | 5,6 | 31 | 10,0 | 0,4 |
| 3b | | 5 | 8,0 | 5,9 | 26 | 8,4 | 0,4 |
| 4a | $(NH_4)_2SO_4$ | 20 | 7,2 | 5,1 | 29 | 8,4 | 0,3 |
| 4b | | 5 | 7,1 | 5,4 | 24 | 6,8 | 0,3 |
| 5a | KCl | 20 | 7,9 | 6,6 | 16 | 5,2 | 0,3 |
| 5b | | 5 | 6,5 | 5,7 | 12 | 3,2 | 0,3 |
| 6a | NaCl | 20 | 8,0 | 6,6 | 18 | 5,6 | 0,3 |
| 6b | | 5 | 6,8 | 5,8 | 15 | 4,0 | 0,3 |
| 7a | $MgSO_4 . 7H_2O$ | 20 | 10,8 | 7,6 | 29 | 12,8 | 0,5 |
| 7b | | 5 | 10,6 | 7,6 | 28 | 12,0 | 0,5 |
| 8a | $Ca(NO_3)_2$ | 20 | 8,1 | 6,6 | 19 | 6,0 | 0,4 |
| 8b | | 5 | 7,5 | 6,3 | 16 | 4,8 | 0,4 |
| 9a | $H_2NCONH_2$ | 20 | 8,5 | 0,3 | 97 | 32,8 | 0,4 |
| 9b | | 5 | 8,2 | 0,4 | 95 | 31,2 | 1,0 |
| 10 | $H_2SO_4$ | 96 | 8,3 | 1,5 | 83 | 27,4 | 0,1 |
| 11 | $H_3PO_4$ | 71 | 7,9 | 7,0 | 11 | 3,6 | 0,02 |

In this series of experiments, sulfuric and phosphoric acid were used in high concentrations as absorbing agents for the nitrous gases. Part of the effectiveness of sulfuric acid is no doubt to be attributed to its high density and its high viscosity. Phosphoric acid, too, has an absorbing action, though it is not very great (see Table 4). Owing to sulfuric acid's specific ability to enter into (complex) compounds with the nitrogen oxides, the efficiency of sulfuric acid is far greater than that of phosphoric acid. The density of the salt solutions used in the experiments is far lower than the densities of phosphoric or sulfuric acid. In the case of the salts, therefore, it is probable that likewise specific complex forming forces are activated which account for their good ability to absorb nitrogen oxides. The fact that diammonium phosphate performs far better than ammonium sulfate is especially surprising in comparison to the corresponding acids.

In both series of experiments the superior effectiveness of the diammonium phosphate solution and of the slurry solution containing diammonium phosphate. The other salt solutions are far less effective. Even when the concentration is increased, the effectiveness of these salts is improved only slightly. In the case of ammonium phosphate solutions, however, the use of a 20% solution results in an efficiency improvement of 5 to 10% over a 5% solution, which is particularly worth while in view of the already excellent effectiveness of 5% solution.

Also tested was the action of urea solution, which likewise produces surprisingly high efficiencies of 95 to 99%. With urea, it is true, decomposition to nitrogen and carbon dioxide is encountered after the physical absorption of the nitrogen oxides. The urea input is thus decomposed and has to be replaced; furthermore, the gaseous nitrogen developed from the nitrogen oxides with urea is no longer usable industrially. Therefore, a process in which urea is used is not an economically desirable method of eliminating nitrogen oxides.

Nevertheless, the use of urea is recommendable in all cases in which extremely low nitrous oxide contents are important in industrial residual gases. If the main part of the nitrogen oxides is bound by absorption with ammonium phosphate or slurry solution and then the remaining nitrogen oxide content is destroyed virtually entirely in a second stage, an excellent method is available, as shown in Table 5, for releasing nitrogen oxide-containing residual gases unobjectionably and without harm to the environment.

A two-stage process using concentrated sulfuric acid or diammonium phosphate solution in the second tower appears to be economically more attractive. In this case it is possible to exploit the nitrous content of the solutions withdrawn from tower 2. The solutions used absorb the nitrous gases at a relatively low initial content with relatively good success, so that the use also appears feasible in a two-stage absorption, and the change of the absorbing agent may bring slight advantages.

In the methods for the absorption of nitrous gases, elevated pressure and/or a great cooling of the salt solution or suspension and/or of the nitrous oxide-containing residual gas is advantageous for the fixation of the nitrogen oxides.

Table 5

Two-stage process for the absorption of nitrogen oxide a. Experimental conditions See Table 4a, but using 2 towers each having a useful capacity of 3.16 m³. A 20% solution of $(NH_4)_2HPO_4$ was fed to Tower 1 in all three experiments, and Tower 2 was supplied with the solutions described in the first line.

b) Results of the Experiments

| Absorbing agent in Stage II | 20% urea | 96% $H_2SO_4$ | 20% solution of $(NH_4)_2HPO_4$ |
|---|---|---|---|
| Nitrous content | | | |
| ahead of absorption towers $gNO/Nm^3$ | 8.6 | 11.4 | 10.5 |
| after leaving Tower 1 $gNO/Nm^3$ | 1.7 | 1.8 | 1.6 |
| after leaving Tower 2 $gNO/Nm^3$ | 0.1 | 0.2 | 0.3 |
| Efficiency | | | |
| of Stage I % | 80 | 84 | 85 |
| of Stage II % | 94 | 89 | 81 |
| total % | 98 | 98 | 97 |
| Nitrous oxide absorbed kgNO/h | 27.6 | 44.8 | 40.8 |
| Nitrous oxide destroyed kgNO/h | 6.4 | — | — |
| Amounts of solution withdrawn or replaced | | | |
| Tower I   $m^3/h$ | 0.5 | 0.5 | 0.5 |
| Tower II  $m^3/h$ | 0.05 | 0.02 | 0.05 |

The salt solutions used in the method of reducing foam in phosphoric acid manufacturing processes are, as already noted, common components of fertilizers. They are therefore generally desired in the fertilizer industry and, with the exception, for example, of sodium chloride, they are not ballast. The batches to which the salt solutions are added can be processed directly into fertilizers.

The nitrite- and nitrate-containing salt solutions produced in the absorption of nitrous gases by the method of the invention and withdrawn from the absorption towers may also be added to fertilizers or may be processed directly into fertilizers.

It also appears possible, however, to drive the nitrogen oxides out of these solutions by heating, with additional acidification if desired, with phosphoric acid for example, and return them to the nitrogen oxide absorption apparatus in concentrated form. The salt solutions which have been largely freed of the nitrous gases can then be returned immediately or after additional processing (e.g., neutralization by the introduction of gaseous $NH_3$ until the pH ranges from 3 to 4) to the absorption towers for the reduction of nitrous gas emission.

What is claimed is:

1. A process for preventing nitrogen oxide loss from a liquid or slurry containing an oxide of nitrogen which comprises applying thereto salt solutions or suspensions of the phosphate of ammonium, the alkali metals and magnesium, individually or in mixtures, said salt solutions or suspensions being used in a concentration of at least 3% by weight and adjusted to a pH value of from 0.5 to 8.

2. Process of claim 1 wherein said salt solutions or suspension is a 5–20 weight percent ammonium phosphate solution or slurry.

3. A process for preventing nitrogen oxide loss from a liquid or slurry containing an oxide of nitrogen which comprises applying thereto salt solutions or suspensions of the phosphate of ammonium, the alkali metals and magnesium individually or in mixtures to reaction mixtures capable of forming nitrogen oxides by adding said solutions or suspensions to the reaction mixtures thereby preventing the formation of nitrogen oxides, said salt solutions or suspensions being used in a concentration of at least 3% by weight and adjusted to a pH value of from 0.5 to 8.

4. Process of claim 3 wherein said salt solutions or suspensions is a 5–20 weight percent ammonium phosphate solution or slurry.

5. Process of claim 3 wherein said reaction mixture is a phosphate rock decomposition with nitric acid and said solutions or suspensions are applied to the surface of the phosphate rock mass in quantities of from 5–20% by weight of the rock mass.

* * * * *